United States Patent [19]

Lieser et al.

[11] 4,022,964

[45] May 10, 1977

[54] ION EXCHANGER ON THE BASIS OF CELLULOSE AND PROCESS FOR ITS MANUFACTURE

[75] Inventors: Karl Heinrich Lieser, Seeheim; Peter Burba, Darmstadt, both of Germany

[73] Assignee: Riedel-de Haen Aktiengesellschaft, Seelze-Hannover, Germany

[22] Filed: July 30, 1975

[21] Appl. No.: 600,298

[30] Foreign Application Priority Data

Aug. 5, 1974  Germany .................. 2437594

[52] U.S. Cl. .................. 536/43; 260/2.1 R
[51] Int. Cl.² .................. C08B 11/00
[58] Field of Search .......... 260/231, 2.1 R; 536/43

[56] References Cited

UNITED STATES PATENTS 3,414,367  12/1968  Welch et al. .............. 260/231 A X
3,720,500  3/1973  Gale .............. 260/231 A X

*Primary Examiner*—Lewis T. Jacobs
*Attorney, Agent, or Firm*—Connolly and Hutz

[57] ABSTRACT

Ion exchanges on cellulose basis containing groups of the formula

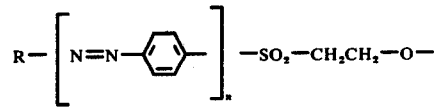

in which R represents a functional group and $n$ is zero or 1 are prepared, when $n$ is zero, by reacting cellulose or a cellulose-like compound with a β-hydroxyethylsulfonyl derivative and, when $n$ is 1, by preparing a cellulose derivative from cellulose and an amino derivative of β-hydroxyethylsulfone, diazotizing the cellulose derivative and introducing R-H functional groups by coupling of ligands capable of being coupled.

6 Claims, No Drawings

ION EXCHANGER ON THE BASIS OF CELLULOSE AND PROCESS FOR ITS MANUFACTURE

This invention relates to an ion exchanger on the basis of cellulose containing groups of the formula

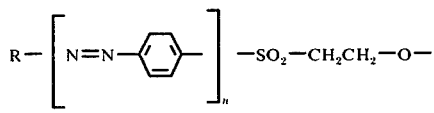

in which R represents a functional group, especially the radical of an organic metal reagent and $n$ is zero or 1. The invention also relates to a process for the manufacture of the said ion exchanger.

The known processes for the manufacture of cellulose ion exchangers (CIE) always use alkali cellulose as starting material. Fibrous or pulverulent cellulose is suspended in concentrated sodium hydroxide solution and reacted with correspondingly substituted acid chlorides or alkyl halides. These reactions are illustrated by the following reaction scheme:

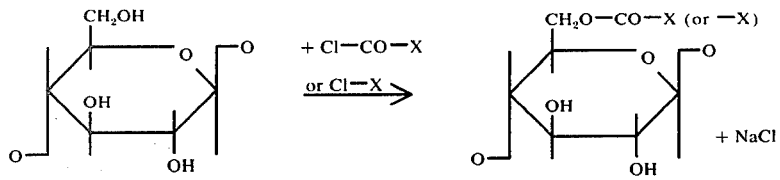

In simplified manner the reactions can be represented by the following equations:

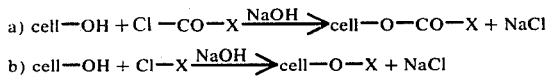

in which cell represents the radical of the cellulose molecule and X stands for a functional group.

In general, the esterification according to the above equation (a) proceeds more readily than the etherification according to equation (b). Hitherto, different cellulose ion exchangers have been produced by the two types of reactions. E. A. Peterson and H. A. Sober describe in J. Am. Chem. Soc. volume 78, page 751 (1956) the preparation of carboxymethyl cellulose cell—O—CH$_2$—COO$^-$ from alkali cellulose and monochloroacetic acid and J. Porath discloses in Arkiv Kemi, volume 11, Page 97 (1957) the preparation of sulfomethyl cellulose cell—O—CH$_2$—SO$_3^-$ from sodium monochloromethane sulfonate and alkali cellulose. The preparation of a cell-phosphoric acid ester cell—O—PO$_3^{2-}$ is described by A. J. Head et al. in J. Chem. Soc. 1958, page 3418. The cation exchangers prepared in this manner have a capacity of 0.6 – 0.7 milliequivalent/g.

In similar manner anion exchangers are prepared from alkali cellulose and alkyl halides. Known representatives of this class are, for example, diethylaminoethyl cellulose (DEAE-C), triethylaminoethyl cellulose (TEAE-C) or ECTEOLA-cellulose (epichlorhydrin-triethanolamine). H. A. Sober and E. A. Peterson describe their method of preparation in Biochemical Preparations volume VIII, edited by J. Wiley and sons, New York 1960. DEAE, TEAE and ECTEOLA are weakly basic exchangers which are used for difficult separations in biochemistry, for example for the separation of nucleic acids. The exchangers of this type have a capacity of 1 to 1.4 milliequivalents per gram.

The diazotation of aminophenyl cellulose derivatives and the coupling of the diazonium compounds formed with ligands capable of coupling has not yet been used for making cellulose ion exchangers. Only D. H. Campbell et al. Proc. Natl. Acad. Aci. U.S. volume 37, page 575 (1951) have diazotized p-aminobenzyl cellulose in 2N hydrochloric acid with sodium nitrite and used the diazonium cellulose derivative obtained for separating antigen and antibody.

Diazonium cellulose derivatives are also used in the graft polymerization with other polymers, for example as described by C. I. Simionescu in J. Polymer Sci. volume 37, page 187(1972).

With regard to inorganic-chemical separating problems the known cellulose ion exchangers have two main drawbacks. Cellulose ion exchangers having specific functional groups which act selectively on definite inorganic ions have not yet been described in literature and cellulose ion exchangers on the basis of cellulose esters are sensitive to acids and alkalies. This is not valid for ion exchangers on the basis of cellulose ethers.

The present invention provides an ion exchanger on the basis of cellulose which contains groups of the formula

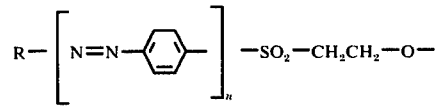

in which R represents a functional group, especially the radical of an organic metal reagent and $n$ is zero or 1.

In simplified manner the ion exchanger according to the invention has the formula

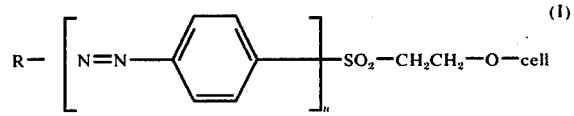

(I)

in which cell stands for the radical of the cellulose molecule and R and $n$ have the above meaning.

The ion exchanger on cellulose basis according to the invention of the above formula in which $n$ is zero can be prepared by transforming complex-forming compounds (ligands), especially organic metal reagents, R-H, i.e. organic compounds forming complexes with certain metals, into their β-hydroxyethyl-sulfonyl derivative of the formula R—SO$_2$—CH$_2$—CH$_2$—O—SO$_3$Na (sodium salt) and reacting the said derivative with cellulose, for example amorphous cellulose cross-linked by formaldehyde, or microcrystalline cellulose, in a suitable organic solvent, for example dimethyl sulfoxide, at a temperature of 70° C with addition of powdered sodium. In a typical mixture about 10% of the sodium salt reacts with the cellulose. The ion exchanger on cellulose basis prepared in this manner has a capacity of from 0.3 to 0.7 milliequivalent per gram, depending on the reaction conditions.

The reaction is illustrated by the following equations 1 and 2:

(1) $R-SO_2-CH_2CH_2-OSO_3Na + NaOH \longrightarrow R-SO_2-CH=CH_2 + Na_2SO_4 + H_2O$
       II                                              III (2) $R-SO_2-CH=CH_2 + HO-cell \xrightarrow{OH^-} R-SO_2-CH_2CH_2-O-cell$
       III              IV                           I The vinylsulfonyl compound III obtained from the sodium salt II in an alkaline medium reacts further with the cellulose IV with formation of the ion exchanger of the invention.

In textile finishing a dyeing process for cellulose is known (German Pat. No. 953,103, British Pat. Nos. 712,037; 733,471; and 740,533) which is slightly similar to the above reactions. In this dyeing process the cellulose is dyed in aqueous-alkaline solution (pH 12) and charged with the dyestuff to a minor extent only (at most 0.04 milliequivalent per gram) since according to reaction 3

(3) $D-SO_2-CH=CH_2 + H_2O \xrightarrow{OH^-} D-SO_2-CH_2CH_2-OH$
         V                                  VI the vinylsulfonyl compound V of the dyestuff D is transformed into the hydroxyethylsulfonyl compound VI of the dyestuff D which can be longer react with the cellulose. Hence, the major portion of the dyestuff is not available for the dyeing process. In contradistinction thereto, in the preparation of the cellulose ion exchanger according to the invention reaction 3 is substantially repressed by an appropriate selection of the reaction mechanism.

To prepare an ion exchanger according to the invention in which $n$ in formula I is 1, the p-aminophenyl derivative VII $p-H_2N-C_6H_4-SO_2-CH_2CH_2-OSO_3Na$      VII is reacted with cellulose in the manner described above to obtain the weakly basic exchanger of the formula VIII $p-H_2N-C_6H_4-SO_2-CH_2CH_2-O-cell$      VIII which is then diazotized in a second stage with a ligand or complex forming compound R-H capable of undergoing a coupling reaction.

The weakly basic ion exchanger of formula VIII has a capacity of from 0.3 to 2 milliequivalents per gram, depending on the reaction time. The diazotization can be carried out, for example, in 5N hydrochloric acid containing 8% $NaNO_2$. By the diazotization and coupling about 30 to 50% of the p-aminophenyl groups are coupled with the new functional group. Coupling with 8-hydroxyquinoline, for example, yields a cellulose ion exchanger in which $n$ is 1 having a capacity of 0.2 to 0.8 milliequivalent per gram. The advantage of this mode of preparation resides in the fact that by simple diazotation and coupling of the ion exchanger of formula VIII with various ligands R-H capable of undergoing a coupling reaction, a great number of cellulose exchangers according to the invention in which $n$ is 1 can be prepared. A ligand is capable of undergoing a coupling reaction when it contains an aromatic amino- or hydroxyl group.

The following examples illustrate the invention.

EXAMPLE 1

Synthesis of a cellulose ion exchangers in which $n$ is zero containing salicylic acid as functional group R comprises 3 parts:
1. preparation of the sodium salt of β-hydroxyethyl sulfuric acid ester containing salicylic acid as radical R and having the formula $R-SO_2-CH_2-CH_2OSO_3-Na$  (Na salt)

2. preparation of amorphous cellulose cross linked with para-formaldehyde
3. reaction of the cellulose with $R-SO_2-CH_2CH_2-OSO_3Na$ (R = salicylic acid) to obtain the cellulose ion exchanger.

(1) 450 g (2.3 moles) salicylic acid were reacted with 1,050 ml 15.3 moles) chlorosulfonic acid to obtain 505 g salicylic acid-5-sulfochloride (65% yield) under the conditions disclosed by J. Stewart in J. Chem. Soc. volume 121, page 2555 (1922). 80 g (0.35 mole) of the sulfochloride were then reacted in 1,500 g ice + 480 g concentrated sulfuric acid at a temperature of −15° C to obtain 40 g 5-mercaptosalicyclic acid (yield 70% of theory).

85 g (0.5 mole) of 5-mercaptosalicylic acid were reacted at room temperature with 41.5 g (0.5 mole) β-chloroethanol in 500 ml sodium hydroxide solution of 20% strength, whereby 90 g 5-(β-hydroxyethyl-mercapto)-salicylic acid melting at 136° C were obtained (yield 71% of theory). 120 g (0.55 mole) of the aryl-alkyl sulfide obtained were oxidized in 200 ml glacial acetic acid at 65° C with 215 ml 30% hydrogen peroxide whereby 103 g 5-(β-hydroxyethyl-sulfonyl)-salicyclic acid (yield 77% of theory) melting at 175° C were obtained. 71.5 g (0.29 mole) of the 5-(β-hydroxyethyl-sulfonyl)-salicylic acid were then reacted for 5 hours at 70° C with a mixture of 20 ml (0.29 mole) chlorosulfonic acid and 150 ml anhydrous dioxane, in which reaction hydrogen chloride was split off. The dissolved 5-(β-hydroxysulfonyl-oxy-ethylsulfonyl)-salicylic acid was reacted with a suspension of 91 g (0.5 mole) barium carbonate in 250 ml water (generation of $CO_2$). After filtration, the limpid solution was concentrated by evaporation at 40° C. 120 g of the barium salt of 5-(-hydroxysulfonyloxyethyl-sulfonyl)-salicylic acid ($R'-SO_2-CH_2CH_2-OSO_3Ba/2$, R' = barium salicylate) melting at 266° C remained behind (yield 90% of theory).

Finally, 116 g (0.25 mole) of the barium salt of 5-(β-hydroxy-sulfonyloxy-ethylsulfonyl)-salicylic acid in 150 ml water were reacted at elevated temperature with a solution of 35.5 g (0.25 mole) sodium sulfate in 100 ml water. After separation of the precipitated barium sulfate, the solution was concentrated at 40° C whereby 88 g of the sodium salt of 5-($\beta$-hydroxysulfonyloxy-ethylsulfonyl)-salicylic acid melting at 300° C were isolated (yield 95% of theory).

(2) 40.5 g (0.14 mole) pulverulent cellulose triacetate (Messrs. Schleicher & Schull, type 123/45 ac) were saponified for 3 hours at 50° C in the absence of water in 250 ml methanolic sodium methylate solution prepared from 11.5 g sodium and 250 ml methanol. After filtration and washing with methanol and glacial acetic acid, 22.5 g amorphous cellulose (98% of theory) were obtained. Under the conditions described by I. L. Wadehra et al, in J. Appl. Polymer Sci. volume 9, page 2634 (1965), 45.5 g (0.27 mole) of the amorphous cellulose were then reacted with 4.55 g solid paraformaldehyde and 4.55 g (0.07 mole) boric acid for 24 hours at 130° C in a bomb tube.

In this reaction 46.2 g of cross-linked amorphous cellulose (98% of theory) were obtained. By the cross-linkage with 2% of formaldehyde the cellulose kept its reactive amorphous condition.

(3) 25.0 g (0.065 mole) of the sodium salt of 5-($\beta$-hydroxysulfonyloxy-ethylsulfonyl)-salicylic acid (1) were dissolved in 350 ml dimethyl sulfoxide and 1.75 ml water and 9.8 g (0.06 mole) of the cross-linked cellulose (2) were added. After heating of the suspension to 80° C, 6.0 g (0.15 mole) of pulverulent sodium hydroxide were added. The reaction mixture was kept for 24 hours at 80° C while stirring, then 250 ml 10% hydrochloric acid were added and the precipitated cellulose ion exchanger was filtered off through a glass frit. After washing with water and methanol, 10.2 g of a cellulose ion exchanger containing salicylic acid as functional group R were obtained in the form of a light brown powder.

The exchanger had a sulfur content of 2.10%. From the S content and by titration of the ion exchanger with N/20 sodium hydroxide solution the capacity was found to be 0.68 milliequivalent per gram. Thus, 10% of the sodium salt had reacted with the cellulose. The distribution coefficients $K_d$ of a series of inorganic ions were also determined.

With the ion exchanger according to the invention especially good results were obtained in the exchange of $Th^{4+}$ and $Fe^{3+}$ ions.

Besides amorphous cellulose also microcrystalline cellulose (Avicel of Merck Ag., Western Germany) was used as exchanger matrix in the process of the invention. The ion exchangers obtained therewith exhibited similar capacities. With a short reaction time of the synthesis the capacity was lower but the exchange was more rapid.

EXAMPLE 2

A cellulose exchanger in which n is 1 and which contained 8-hydroxyquinoline as functional group R was synthetized in three stages:
1. preparation of the cellulose derivative p—H$_2$N—C$_6$H$_4$—SO$_2$—CH$_2$CH$_2$—O—cell (VIII)
2. diazotation of compound VIII
3. coupling of the diazonium compound obtained with 8-hydroxyquinoline.

(1) 20 g (0.125 mole) microcrystalline cellulose which had been cross-linked with paraformaldehyde were suspended in 150 ml dimethyl sulfoxide with addition of 4 ml water and 13.6 g pulverulent sodium hydroxide (0.34 mole) were added. The mixture was maintained for 1 hour at 75° C. Next, 40 g 4-aminophenyl-$\beta$-sulfatoethyl-sulfone were added and the reaction mixture was stirred for 15 hours at 75° C. The reaction was terminated by adding 200 ml hydrochloric acid of 10% strength, the reaction product was filtered off and repeatedly washed with water and acetone. 29.0 g of compound VIII were obtained in the form of a yellowish powder. The substance had a nitrogen content of 2.70% and a sulfur content of 6.22%. From the nitrogen and sulfur content a capacity of p-aminophenyl groups of 1.95 millimoles/g was calculated.

(2) 2.0 g (0.012 mole) of compound VIII having a p-aminophenyl content of 1.54 mole/g were suspended at 0° C in 100 ml 5N hydrochloric acid and, while stirring, 20 ml NaNO$_2$ solution containing 8.5 g NaNO$_2$ were added dropwise. The reaction mixture was kept at 0° C for 1 hour. By filtration over a glass frit the diazonium cellulose was separated, washed at 0° C with distilled water and after a short period of time further processed as described sub(3)

(3) 2.0 g of the diazonium cellulose were added at 0° C to 100 ml 8-hydroxyquinoline solution of 3.5% strength, the pH of which had been adjusted to 12 by adding 0.5 g NaOH. The reaction was stirred for 4 hours at 0° C and a further 4 hours at room temperature. Next, the reaction product was separated by filtration, washed with dilute hydrochloric acid, distilled water and acetone and dried under reduced pressure. 2.2 g of a dark red powder were obtained having a nitrogen content of 4.05%.

The ion exchanger obtained in this manner containing 8-hydroxy-quinoline as functional group R was titrated in the H form in 1 molar sodium chloride solution with N/10 sodium hydroxide solution. The titration curve indicated a capacity of exchangeable hydrogen ions of 0.80 milliequivalent per gram. The sodium form of the exchanger had a dark violet color. When charged with $Fe^{3+}$, the exchanger acquired a dark brown color.

In analogous manner exchangers with the following functional groups R were prepared:
4,5-dihydroxyphenyl-1,3-disulfonic acid (Tiron)
alizarin S
morin
1,8-dihydroxynaphthalene-3,6-disulfonic acid (chromotropic acid)

The exchange capacities, determined by titration of the exchangeable protons, were found to be as follows for the cellulose exchangers with

| | |
|---|---|
| R = 8-hydroxyquinoline | 0.80 milliequivalent per gram |
| R = Tiron | 1.10 milliequivalent per gram |
| R = alizarin S | 0.35 milliequivalent per gram |
| R = morin | 0.20 milliequivalent per gram |
| R = chromotropic acid | 0.60 milliequivalent per gram |

The ion exchangers according to the invention are little pH sensitive and are distinguished by a selectivity for certain metal ions, depending on the nature of group R.

What is claimed is:

1. An ion exchange cellulose derivative having groups of the formula

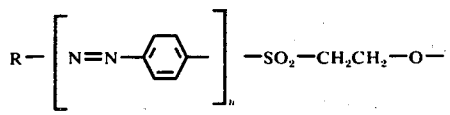

in which R is an ion exchange group and n is zero or 1.

2. An ion exchange cellulose derivative as claimed in claim 1, wherein R is the radical of an organic metal reagent.

3. A process for the manufacture of an ion exchanger as claimed in claim 1, in which n is zero, which comprises reacting cellulose or a cellulose derivative with a β-hydroxyethylsulfonyl derivative having an R—SO$_2$—CH$_2$—CH$_2$—O—group and being couplable with cellulose or a cellulose derivative, R being an ion exchange group.

4. The process as claimed in claim 3, wherein the β-hydroxyethylsulfonyl derivative is a compound of the formula R—SO$_2$—CH$_2$CH$_2$—OSO$_3$Na in which R is an ion exchange group being linked by the —SO$_2$—CH$_2$—CH$_2$—O— bridging group to the cellulose.

5. A process for the manufacture of an ion exchanger as claimed in claim 1 in which n is 1, which comprises: (a) preparing an amino derivative of β-hydroxyethylsulfone, (b) preparing a diazotizable cellulose derivative from the amino derivative of step (a) and cellulose, (c) diazotizing the cellulose derivative of step (b), and (d) coupling the diazotized cellulose derivative of step (c) with a compound having an ion exchange group R.

6. The process of claim 5, wherein the amino derivative of step (a) has the formula para—H$_2$H—C$_6$H$_4$—SO$_2$—CH$_2$CH$_2$—OSO$_3$Na and the cellulose derivative of step (b) has the formula para—H$_2$N—C$_6$H$_4$—SO$_2$—CH$_2$CH$_2$—O— cell.

* * * * *